Oct. 29, 1968  HEIJI YOSHIZAWA ET AL  3,407,682
CONTROL DEVICE FOR POWER-DRIVEN VEHICLES HAVING
HYDRAULICALLY DRIVEN SPEED-CHANGING MECHANISMS
Filed Nov. 23, 1966  2 Sheets-Sheet 1

INVENTORS
HEIJI YOSHIZAWA
YASUO SUZUKI
KATSUHIRO WATANABE
BY
ATTORNEYS

Oct. 29, 1968   HEIJI YOSHIZAWA ET AL   3,407,682
CONTROL DEVICE FOR POWER-DRIVEN VEHICLES HAVING
HYDRAULICALLY DRIVEN SPEED-CHANGING MECHANISMS
Filed Nov. 23, 1966                           2 Sheets-Sheet 2

INVENTORS
HEIJI YOSHIZAWA
YASUO SUZUKI
KATSUHIRO WATANABE
BY
McGlew and Toren
ATTORNEYS

United States Patent Office 3,407,682
Patented Oct. 29, 1968

3,407,682
CONTROL DEVICE FOR POWER-DRIVEN VEHICLES HAVING HYDRAULICALLY DRIVEN SPEED-CHANGING MECHANISMS
Heiji Yoshizawa, Yokohama-shi, Yasuo Suzuki, Komatsu-shi, and Katsuhiro Watanabe, Tokyo-to, Japan, assignors to Kabushiki Kaisha Komatsu Seisakusho, Tokyo-to, Japan, a joint-stock company of Japan
Filed Nov. 23, 1966, Ser. No. 596,535
Claims priority, application Japan, Dec. 27, 1965, 40/80,103
6 Claims. (Cl. 74—471)

ABSTRACT OF THE DISCLOSURE

A device for use in a powered vehicle of the crawler-type for use in controlling both the forward and rearward speed and the turning of the vehicle. A control member is mounted at its base in a housing and is arranged to be rotated about its own axis and also about an axis through the housing perpendicular to its axis. The control member is rotatable about its own axis for regulating the turning action of the vehicle and it is rotated or pivoted about the axis through the housing to regulate the speed of the vehicle. Communicating between the control member and a pair of hydraulically driven speed-changing mechanisms is an assembly including a pair of rotatable rings which are engageable with the control member and with rod link means for transmitting the motion of the control member to the speed-changing mechanisms. When the control member is rotated or pivoted about the axis perpendicular to its own axis, the rod linking means are both moved in the same direction for controlling the forward and rearward movement of the vehicle, however, when the control member is rotated about its own axis. the rod link means are moved in opposite directions for turning the vehicle to the left or to the right.

Summary of the invention

This invention relates to the control systems of power-driven vehicles and, more particularly to a new and improved control device for steering and controlling the direction and speed of travel of power-driven vehicles having fluid-drive or hydraulically (oil pressure) driven speed-changing mechanisms, particularly vehicles of the crawler type.

The above mentioned hydraulically driven speed-changing mechanisms are, in general, of the type each comprising a variable discharge pump and a hydraulic motor driven by the hydraulic fluid discharged by the pump when the pump is driven by a power source, the direction and speed of vehicle propulsion power being controllably varied by varying the discharge rates of the pump or the motor.

Heretofore, the steering and controlling of the direction and speed of travel of crawler tractors or like vehicles have been accomplished by manually operating two or more levers or pedals. This vehicle travel control, in itself, is relatively simple, but in the case where working implements or attachments for excavation, loading, and other work are mounted on the vehicle, it is necessary for the operator to operate these implements at the same time that he is driving the vehicle. Consequently, the entire operating work for the operator is extremely complicated and strenuous, mentally as well as physically.

Furthermore, when directions of the control movements of the control handles and pedals do not correspond to the direction of travel of the vehicle, the operator cannot drive the vehicle according to his natural sense and instinct.

It is an object of the present invention to overcome the above described difficulties.

More specifically, an object of the invention is to provide a control device wherein, by the use of a single control member, the steering and controlling of the direction (forward or reverse) and speed of travel of the vehicle can be accomplished simultaneously, and, moreover the directions of the control movements are caused to correspond substantially with the travel and steering directions of the vehicle thereby to improve remarkably the maneuverability, ease of operation, and work performance of vehicles of the above stated type.

It is another object of the invention to provide a control device of the above stated character which is of relatively simple and inexpensive construction and of simple and reliable mechanical operation.

According to the present invention, briefly stated, there is provided, in a powered vehicle of crawler type having two hydraulically driven speed-changing mechanisms provided with respective speed-change levers for changing the directions and speeds respectively of the left and right vehicle propulsion drives, a control device for simultaneously steering the vehicle and controlling the travelling direction and speed thereof comprising, in combination, a control member for initiating control, capable under controlling action of undergoing simultaneously but independently variable first and second displacements respectively with two different degrees of freedom and a transmitting mechanism linking the control member to the speed-change levers to transmit the first displacement in equal magnitude to both speed-change levers thereby to control the direction and speed of said drives and to transmit the second displacement as displacements of differential magnitudes respectively to the speed-change levers thereby to accomplish steering of the vehicle.

The nature, principle, and details of the invention will be more clearly apparent from the following detailed description with respect to a preferred embodiment of the invention when read in conjunction with the accompanying drawings, in which like parts are designated by like reference numerals.

Figure 1A:
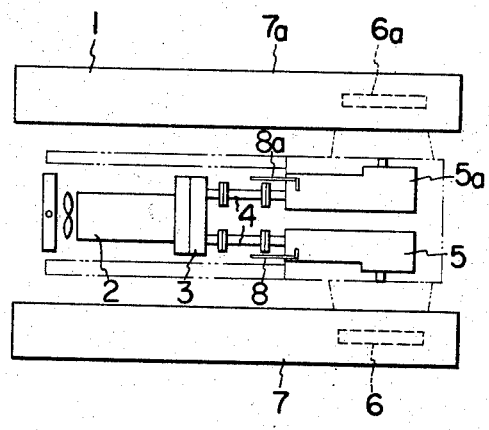
FIG. 1(a) is a simplified plan view schematically showing an example of a power-driven vehicle in which the control device of the invention is installed.

Referring to FIG. 1(a) showing an example of vehicle 1 in which the control device of the invention is installed, the power output from an engine 2 mounted on the vehicle 1 is divided by a torque splitter 3 into two transmission paths and transmitted through two shafts 4, 4 to left and right speed-changing mechanisms 5 and 5a. The rotational power reduced in speed by the speed-changing mechanisms 5 and 5a is transmitted through final drives to left and right driving wheels (sprockets) 6 and 6a thereby to drive respective tracks 7 and 7a, whereby the vehicle is caused to travel.

The rotational speeds and directions of the power transmitted through the speed-changing mechanisms 5 and 5a are varied by speed-change levers 8 and 8a, which are coupled at their free ends respectively to rods 9 and 9a of the control device according to the invention. The operations of the speed-changing mechanisms 5 and 5a are thereby controlled by the advancement and retraction of these rods 9 and 9a.

Figure 1B:
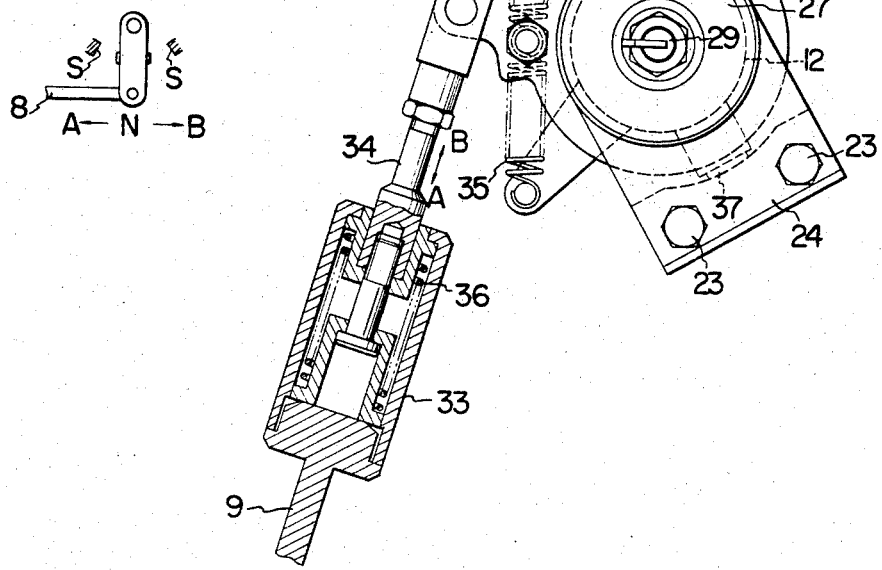
FIG. 1(b) is a partial diagrammatic view indicating the directions of movement and stop means therefor of a speed-change lever.

The movement of each speed-change lever is limited by stops S, S as shown in FIG. 1(b). When each speed-change lever 8 (or 8a) is moved toward direction A as indicated in FIG. 1(b), the corresponding speed-changing mechanism 5 (or 5a) is shifted into the forward drive direction. Conversely, when the lever 8 (or 8a) is moved toward direction B, the speed-changing mechanism 5 (or 5a) is shifted into the reverse drive direction.

In a preferred embodiment of the invention as illustrated in FIGS. 2 through 5, inclusive, there is provided a control handle 10a integrally secure to a control column 10, the base part of which is inserted into a housing 12 through a retainer 11 interposed therebetween and is rotatably supported by bearings 13 fitted between the inner wall of the housing 12 and the base part of the control column 10.

Against opposite outer side of the housing 12, there are fitted plates 14 and 14a, which are supported respectively by side plates 16 and 16a by way of bearings 15 and 15a interposed between outwardly extending hub-like parts of plates 14 and 14a and inner surface of holes in the side plates 16 and 16a, and linings 17 and 17a are clamped between the outer side surfaces of the plates 14 and 14a and the inner side surfaces of side plates 16 and 16a. Furthermore, rings 18 and 18a are fitted rotatably onto the outer periphery of the plates 14 and 14a.

To the upper edge parts of these rings 18 and 18a, there are fixed pin socket seats 19 and 19a provided with socket slots 20 and 20a for receiving spherical tips (balls) 22 and 22a of pins 21 and 21a fixed to the aforementioned control column 10 and extending perpendicularly outwardly therefrom opposite sides thereof.

The lower ends of the side plates 16 and 16a are secured by bolts 23 and 23a to opposite (left and right) sides of a bracket 24 interposed therebetween. Against the outer side surfaces of the side plates 16 and 16a, plates 26 and 26a are attached over linings 25 and 25a interposed therebetween. Spring seats 27 and 27a are held by bolt-and-nut combinations 29 and 29a and retain compression springs 28 and 28a in compressed state between the spring seat 27 and plate 26 and between the spring seat 27a and plate 26a.

The bolts of the bolt-and-nut combinations 29 and 29a are respectively inserted horizontally through central holes in the plates 14 and 14a, plates 26 and 26a, and seats 27 and 27a and have a common centerline axis intersecting the axis of the control column 10, the heads of these bolts being seated against shoulders in the plates 14 and 14a. Pins 30 and 30a are slidably inserted also through the plates 14 and 14a, plates 26 and 26a, and seats 27 and 27a with orientations parallel to the above mentioned bolts, whereby these plates and seats on their respective sides are integrally locked against relative rotation and are free to rotate as integral assemblies on the bearings 15 and 15a relative to the side plates 16 and 16a.

Horizontal pins 31 and 31a are respectively inserted into the inner side of the plate 14 and outer side of the housing 12 and into the inner side of the plate 14a and outer side of the housing 12.

The aforementioned rings 18 and 18a are respectively connected to parts of the housing 12 by tension springs 35, 35 installed therebetween thereby to maintain constantly the relative angular positions of the housing 12 and rings 18 and 18a.

The rings 18 and 18a are further provided respectively with forwardly-projecting arms 32 and 32a which are pin connected through clevis joints to rods 34 and 34a connected by connectors 33 and 33a to the base ends of the aforementioned rods 9 and 9a connected in turn to the speed-change levers 8 and 8a of the speed-changing mechanisms 5 and 5a. The connectors 33 are of compressible type and are respectively provided with longitudinally sliding parts and buffer springs 36 each of which has a spring constant such that it is not fully compressed at the maximum required control force to be imparted through the corresponding rod 9 (or 9a), whereby, when the rod 9 (or 9a) reaches the end of its stroke, only the rod 34 (or 34a) can still slide longitudinally within the connector 33 (or 33a).

Figure 4:
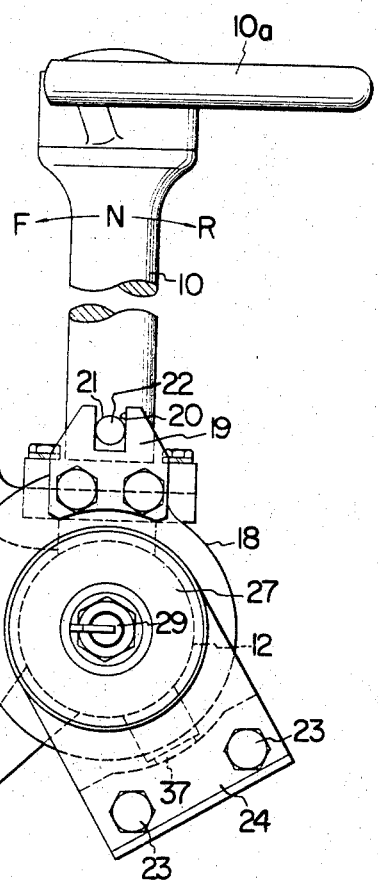
FIG. 4 is a side elevational view, partly in longitudinal section, of the device of the invention.

The housing 12 is provided at its lower end with a spring-thrust click-ball 37 which, together with a recess 38 formed on the inner surface of the bracket 24, constitutes a click stop for determining the neutral position N between the forward direction F and reverse direction R of the movement of the control column 10 indicated in FIG. 4.

The control device of the above described composition and arrangement according to the invention operates in the following manner.

For travel direction and speed control, the control column 10 is tilted through a certain angle forwardly (F) or rearwardly (R) as indicated in FIG. 4, whereupon the rings 18 and 18a are simultaneously rotated in unison by the pins 21 and 21a of the control column 10 either forwardly or rearwardly, whereby the left and right rods 34 and 34a and rods 9 and 9a are simultaneously actuated and caused to undergo the same strokes. Accordingly, the speed-change ratios of the left and right speed-changing mechanisms 5 and 5a are varied by the same amount.

Thus, when the control column 10 is tilted forwardly (F), the vehicle travels forwardly, and when the control column is tilted rearwardly (R), the vehicle travels in reverse, the speed of travel in either direction being approximately proportional to the angle of tilt of the control column 10. During this operation, the control column is held in any stopped position by the linings 17, 17a, 25, and 25a.

Figure 2:
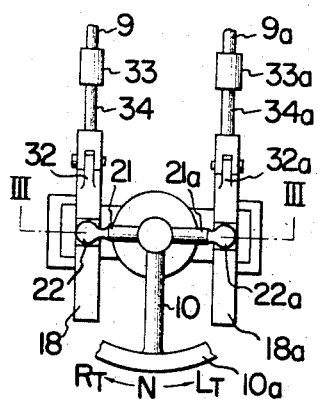
FIG. 2 is a diagrammatic plan view, with parts cut away, showing essential parts of the device of the invention.
Figure 5:
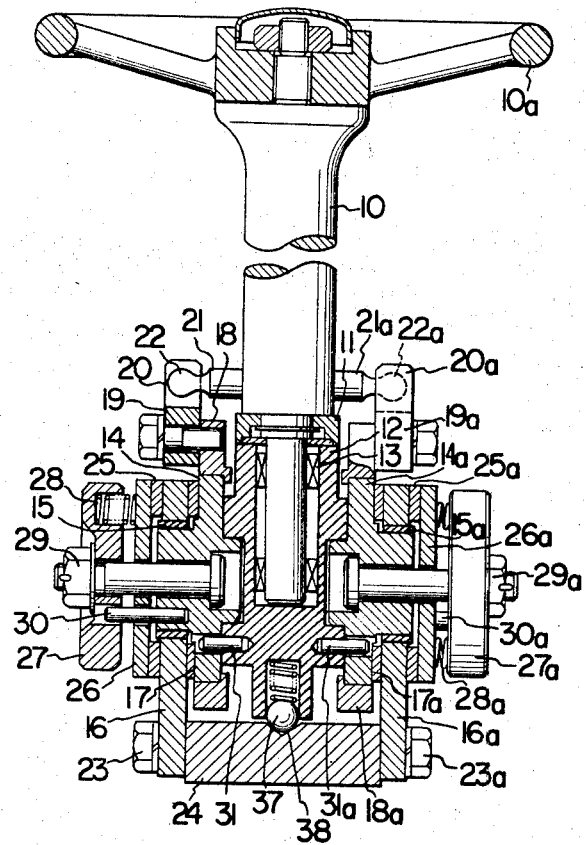
FIG. 5 is a front elevational view of the device of the invention, a part thereof being foreshortened and a part thereof being shown in vertical section to show details of the essential parts.
Figure 3:
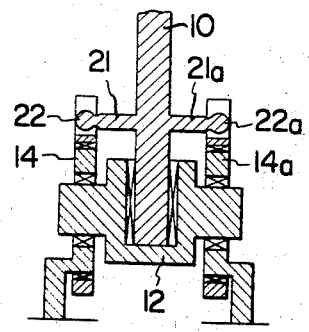
FIG. 3 is an elevational view, in vertical section taken along the plane indicated by line III—III in FIG. 2.

For steering the vehicle, the control handle 10a is turned in the direction $R_T$ or $L_T$ as indicated in FIG. 2 (that is, clockwisely or counterclockwisely), whereupon the pins 21 and 21a of the control column 10 rotate the rings 18 and 18a in mutually opposite directions to cause the rods 34 and 34a to move in mutually opposite directions, whereby a difference in the speed-change ratios of the left and right speed-changing mechanisms 5 and 5a is produced.

That is, when the control handle 10a is turned clockwisely in the direction $R_T$ during forward travel, the driving speed transmitted to the left side (i.e., left track) becomes higher than that transmitted to the right side (i.e., right track), whereby the vehicle undergoes a right turn. Conversely, when the control handle 10a is turned to the left, the vehicle turns to the left.

When, with the left and right rods 34 and 34a at the end of their strokes in the direction A as indicated in FIG. 4, the control handle 10a is turned in the direction $R_T$, the left-hand pin 21 similarly moves the left-hand ring 18 in the direction F, while the right-hand pin 21a moves the right-hand ring 18a in the direction R. In this case, the left-hand rod 34 compresses the spring 36 in the corresponding connector 33 and thus operates, but the left-hand rod 9 is stopped by a stroke end stops S of the speed-changing mechanism 5, while the right-hand rd 34a is moved in the direction B. As a result, the speed of the right-hand drive becomes lower than that of the left-hand drive, whereby the vehicle makes a right turn.

Thus, through the application of the present invention to a powered vehicle in the above described manner, it is possible to accomplish simultaneous control or traveling direction, travel speed, and steering direction by means of a single control member, whereby the driving operation is greatly facilitated. At the same time, since the direction in which this control member is moved and the resulting direction of travel of the vehicle can be caused to coincide, confusion and error during operation can be eliminated. Accordingly, it is possible by the use of the control device of the present invention to improve remarkably the maneuverability, ease of operation, and work performance of powered vehicles such as crawler tractors.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claims.

What we claim is:

1. In a powered vehicle of the crawler type, such as a crawler tractor, having two hydraulically driven speed-changing mechanisms provided with respective speed-change levers for changing the directions and speeds respectively of the left and right vehicle propulsion drives, a control device comprising, in combination, a control member for initiating control provided with pins projecting outwardly from opposite sides thereof, a housing for rotatably supporting the base part of the control member, two plates rotatably supported on respective opposite sides of the housing, two rings rotatably supported on the outer peripheries of respective plates and driven respectively in rotation by said pins, and rod link means for transmitting movements of the rings to respective speed-change levers.

2. In a powered vehicle of the crawler-type as set forth in claim 1, wherein said control member comprises a control column rotatably supported at its base within and extending axially from said housing and a control handle attached to said control column at its end remote from said housing and disposed in a plane transverse to the axis of said control column, said pins of said control member located on said control column, said control member being rotatable in a first direction and in a second direction, in the first direction said control member is rotatably about an axis through its base within said housing which axis is arranged substantially perpendicularly to the axis of said control column and in the second direction said control member is rotatable about the axis of said control column, said rod link means comprising a pair of spaced actuating rods each connected to a different one of said rings and to a respective one of said speed-change levers, whereby as said control member is rotated in the first direction said pins on said control column rotate both of said rings in the same direction and said rings move said actuating rods in the same direction and the vehicle is moved in a forward or rearward direction, and as said control member is rotated in the second direction said pins rotate said rings in opposite directions and said rings move said actuating rods in opposite directions for turning the vehicle, and the direction of movement of said control member in the first and second directions corresponding to the direction of movement imparted thereby to the vehicle.

3. In a powered vehicle of the crawler-type, as set forth in claim 2, wherein said plates are rotatable about the axis for the first directional movement of said control member, each of said rings having an outwardly extending part attached to the periphery thereof and arranged to engage said pins on said control column whereby as said control column is rotatably displaced in the first direction said pins rotate said rings in the same direction on said plates, and as said control column is rotatably displaced in the second direction said pins rotate said rings in opposite directions on said plate, and said actuating rods are connected to the periphery of said rings at positions angularly spaced from the engagement of said rings with said pins for transmitting the motion of said rings to said speed change levers.

4. In a powered vehicle of the crawler-type as set forth in claim 3, wherein each of said actuating rods comprises a first rod section connected to one of said speed-change levers, a second rod section connected to one of said rings, and a sleeve-like member interconnecting said first and second rod sections, said sleeve-like member having a buffer means therein operable by a control force exceeding the force normally required to operate said speed-change lever permitting further movement of said second rod section and said ring after said speed change lever is stopped at the end of its working stroke.

5. In a powered vehicle of the crawler-type, as set forth in claim 4, wherein a bracket is arranged to be secured to the vehicle, means attached to said bracket for supporting said plates, lining means interposed between said plate and said means and within said means for securing said control member in position as it is rotated in the first direction.

6. In a powered vehicle of the crawler-type, as set forth in claim 4, wherein said control member has a neutral position, said bracket having a recess part therein, a ball and spring assembly disposed within said housing and arranged to be engaged with the recess part of said bracket for stopping the rotation of said control member in the neutral position in its movement in the first direction.

References Cited

UNITED STATES PATENTS

| | | | |
|---|---|---|---|
| 644,853 | 3/1900 | Fahl | 180—85 |
| 3,181,389 | 5/1965 | Richard | 74—480 |

FRED C. MATTERN, Jr., *Primary Examiner.*

B. T. CALLAHAN, *Assistant Examiner.*